United States Patent
Maehara et al.

[11] Patent Number: 5,300,744
[45] Date of Patent: Apr. 5, 1994

[54] HIGH-FREQUENCY HEATING DEVICE EMPLOYING SWITCHING TYPE MAGNETRON POWER SOURCE

[75] Inventors: Naoyoshi Maehara, Shiki; Daisuke Bessyo, Nara; Yuji Nakabayashi, Yamatokoriyama; Takahiro Matsumoto, Ikoma, all of Japan

[73] Assignee: Matsushita Electric Industrial Co., Ltd., Osaka, Japan

[21] Appl. No.: 842,144
[22] PCT Filed: Jul. 2, 1992
[86] PCT No.: PCT/JP91/00891
§ 371 Date: Mar. 20, 1982
§ 102(e) Date: Mar. 20, 1992
[87] PCT Pub. No.: WO92/02110
PCT Pub. Date: Feb. 6, 1992

[30] Foreign Application Priority Data

Jul. 25, 1990 [JP] Japan ............... 2-197249

[51] Int. Cl.⁵ .............................. H05B 6/68
[52] U.S. Cl. ..................... 219/687; 219/725; 219/760; 219/715; 323/325; 323/356; 361/88; 363/56; 363/97
[58] Field of Search ......... 219/10.55 R, 10.55 B, 219/10.55 M, 10.55 D; 331/87, 88; 363/56, 21, 131, 97; 323/356, 357, 325, 901; 361/88; 99/325, 451

[56] References Cited

U.S. PATENT DOCUMENTS

| | | | |
|---|---|---|---|
| 3,710,065 | 1/1973 | Crapuchettes | 219/10.55 B |
| 4,129,834 | 12/1978 | Kerstens | 219/10.55 D |
| 4,318,165 | 3/1982 | Kornrumpf et al. | 219/10.55 B |
| 4,504,767 | 3/1985 | Levie et al. | 219/10.55 B |
| 4,623,771 | 11/1986 | Sakino | 219/10.55 R |
| 4,812,617 | 3/1989 | Takeuji et al. | 219/10.55 R |
| 4,812,960 | 3/1989 | Sakamoto et al. | 219/10.55 B |
| 4,857,685 | 8/1989 | Vigano et al. | 219/10.55 B |
| 4,967,051 | 10/1990 | Maehara et al. | 219/10.55 B |
| 4,977,301 | 12/1990 | Maehara et al. | 219/10.55 B |
| 5,001,318 | 3/1991 | Noda | 219/10.55 B |
| 5,012,058 | 4/1991 | Smith | 219/10.55 B |
| 5,045,638 | 9/1991 | Wada et al. | 219/10.55 D |
| 5,053,682 | 10/1991 | Shoda et al. | 331/87 |
| 5,091,617 | 2/1992 | Maehara et al. | 219/10.55 B |

FOREIGN PATENT DOCUMENTS 0202579 11/1986 European Pat. Off. .

Primary Examiner—Bruce A. Reynolds
Assistant Examiner—Tu Hoang
Attorney, Agent, or Firm—Wenderoth, Lind & Ponack

[57] ABSTRACT

A high-frequency heating device includes a power converter for converting an electric power from a commercial power source or the like into a high-frequency power, a step-up transformer having a high-voltage winding and a low-voltage winding, a magnetron receiving high-voltage and low-voltage outputs, a resonance circuit connected in series or parallel with the filament of the magnetron, and a control circuit. The control circuit controls the power converter so that the operation frequency of the power converter approximately coincides with the resonance frequency of the resonance circuit at the time of activating the power converter to thereby achieve a rapid start of the oscillation operation of the magnetron while suppressing a high voltage from taking place at the activation time to prevent the possible occurrence of the moding phenomenon.

6 Claims, 10 Drawing Sheets

HIGH-FREQUENCY HEATING DEVICE EMPLOYING SWITCHING TYPE MAGNETRON POWER SOURCE

FIELD OF THE INVENTION

The present invention relates to a high-frequency heating device for such use as an electronic oven for heating food, fluid, or the like, a heat treatment apparatus for waste processing, or a humidification device for medical treatment, and more particularly to a high-frequency heating device having a construction where a magnetron is driven by means of a switching power source employing a semiconductor switching element.

BACKGROUND OF THE INVENTION

Conventionally, a high-frequency heating device of the above type as represented by an electronic oven employs a high-frequency energy generating system which consists of a magnetron and a power source unit for driving the magnetron. A permanent magnet type magnetron and a ferroresonance type power transformer have been practically used for a long time. In recent years, with improvements in semiconductor technology, a switching type power source was proposed and put to practical use in place of the conventional ferroresonance type transformer achieve improved functional development, compact and light weight design, and cost reduction of the high-frequency heating device. In other words, use of a switching type power source enables a continuous proportional control of the microwave output and permits compact and light weight designing of the high-voltage transformer, which also leads to achieving high-performance heating with high-grade control, compact and light weight designing, and cost reduction of the high-frequency heating device.

Figure 11:
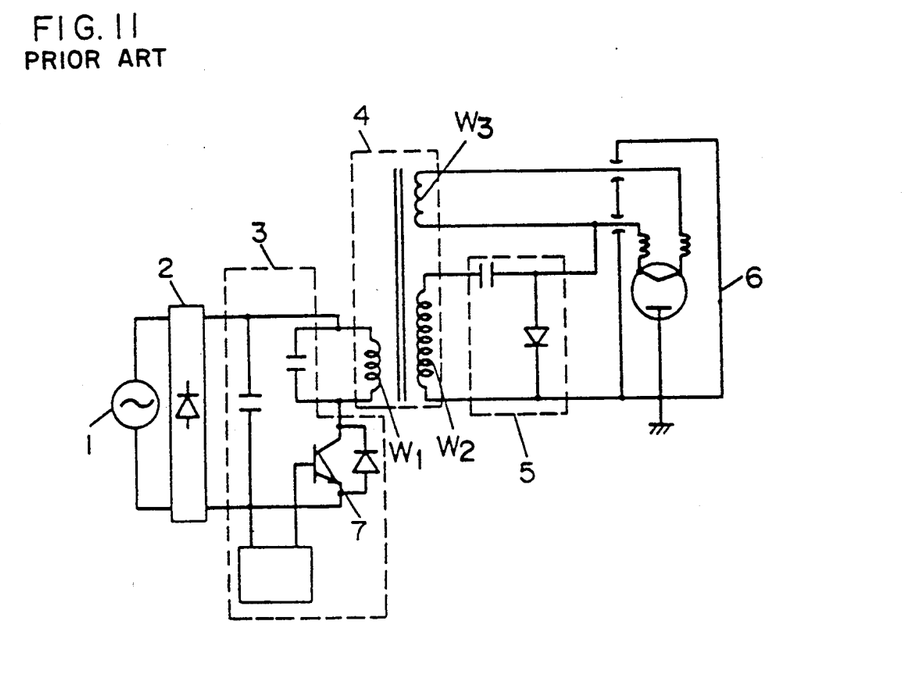
FIG. 11 is a circuit diagram of a conventional high-frequency heating device.

FIG. 11 shows the circuit construction of a conventional high-frequency heating device. In FIG. 11, a commercial AC power source 1 is rectified by a rectifier 2 into a DC power and then converted into a high-frequency AC power by an inverter circuit 3 consisting of capacitors and a semiconductor switching element. The high-frequency AC power obtained by the inverter circuit 3 is applied to a transformer 4. The transformer 4 comprises a primary winding W1 to which the high-frequency AC power output produced in the inverter circuit 3 is applied, a secondary winding W2 for yielding a high voltage through a voltage step-up, and a tertiary winding W3 for yielding a low voltage.

The high AC voltage yielded in the secondary winding W2 is converted into a high DC voltage by a voltage doubler rectifier circuit 5 and is applied across the anode and the cathode of a magnetron 6 to thereby activate the magnetron.

The low voltage yielded in the tertiary winding is applied to the cathode of the magnetron 6 to heat the filament.

Figure 12:
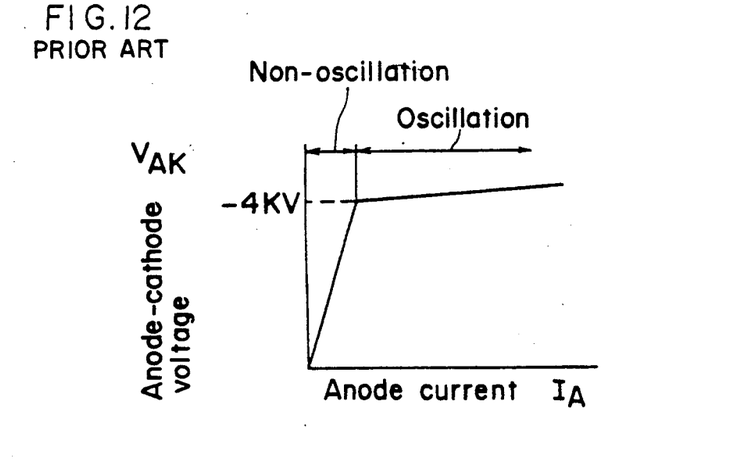
FIG. 12 is a chart of volt-ampere characteristics of a magnetron.
Figure 13A:
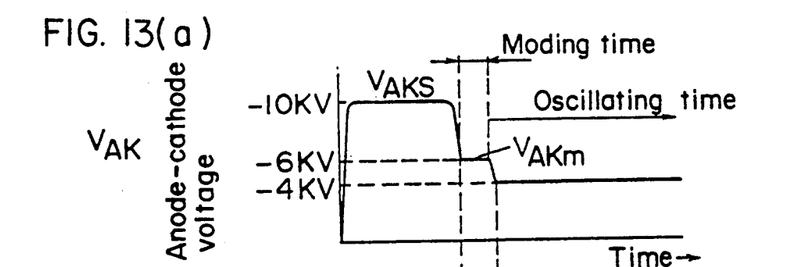
Figure 13B:
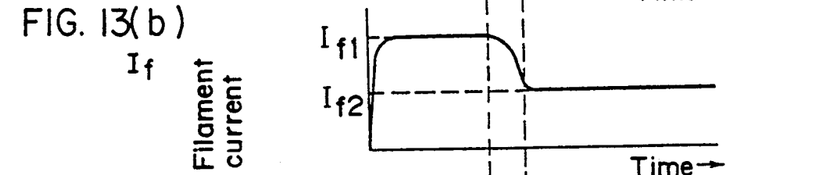
Figure 13C:
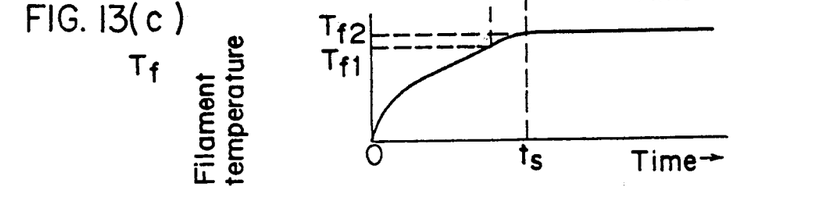

The magnetron 6 exhibits a non-linear characteristic as shown in FIG. 12. In a condition where the filament of the magnetron 6 is sufficiently heated, the magnetron starts to oscillate when the voltage VAK applied across the anode and the cathode thereof reaches about $-4$ kV, with which the voltage VAK across the anode and the cathode is clipped at $-4$ kV to reduce the impedance of the magnetron 6 to about several kiloohms. On the contrary, in a condition where the filament is not heated, or the voltage VAK across the anode and the cathode is lower than about $-4$ kV, the magnetron 6 is set in a non-oscillating condition and the impedance thereof remains virtually infinite. FIGS. 13 (a), (b), and (c) show the mutual relationship between the voltage VAK applied across the anode and the cathode, a current $I_f$ flowing through the filament, and the temperature of the filament in a period from the activation time of the inverter 3 to the oscillation time of the magnetron 6. At the activation time, a greater filament current $I_{f1}$ flows in order to rapidly increase the filament temperature $T_f$ to a rating temperature $T_{f2}$. The tertiary winding W3 of the transformer 4 for supplying a current to the filament and the secondary winding W2 for yielding a high voltage to be applied across the anode and the cathode are provided in the same transformer. Therefore, the secondary winding W2 is compelled to yield such a high voltage as to form a voltage VAKS, which is higher than the oscillation voltage of generally $-4$ KV of the magnetron 6, across the anode and the cathode.

That is, it has been conventionally inevitable that a voltage which is much higher than the oscillation voltage of the magnetron 6 is applied across the anode and the cathode of the magnetron 6 at the time of activating the high-frequency heating device in order to rapidly increase the filament temperature $T_f$ to the rating temperature $T_{f2}$. For example, the voltage VAKS across the anode and the cathode at the activation time is compelled to be $-8$ kV to $-10$ kV despite the fact that the oscillation voltage of the magnetron 6 is usually about $-4$ kV.

Therefore, it has been required to design the endurance voltages of the diode and capacitors used in the voltage doubler rectifier circuit 5, rectifying the voltage yielded in the secondary winding W2 of the transformer, so as to tolerate the high voltage generated at the activation time. The above also results in such problems that the dimensions of the capacitors and the diode must be increased and the reliability is significantly degraded due to heat concentration accompanied by the increase in the amount of diode elements for the purpose of increasing the endurance voltage of the diode having a stack construction.

The interval from the time the filament temperature $T_f$ permits the start of thermionic emission to the time the filament temperature reaches the rating temperature at which a sufficient thermionic emission is achieved (the interval from $T_{f1}$ to $T_{f2}$ in FIG. 13) corresponds to the time period where the magnetron 6 enters from the non-oscillation condition into the oscillation condition. In the above time interval, the filament temperature $T_f$ has not yet reached the temperature sufficient for thermionic emission from the filament necessary for normal oscillation of the magnetron 6, therefore, an abnormal oscillation referred to as "moding" occurs to result in the problem of shortening the life time of the magnetron 6.

On the contrary, when an activation starts with the output of the inverter circuit 3 reduced in order to suppress the voltage VAKS across the anode and the cathode at the activation time, the filament current $I_f$ is reduced to result in the drawback of significantly prolonging the time $t_s$ necessary for activating the magnetron.

As is well known, the output of the inverter circuit 3 can be easily adjusted by controlling the conducting time of a transistor 7. However, when the conducting time of the transistor 7 is controlled to adjust the power produced in the primary winding W1, the power yielded in the tertiary winding W3 also changes while obtaining a capability of controlling the output of the secondary winding W2 supplying a high voltage power, which also changes the filament temperature $T_f$ of the magnetron 6 to promote the deterioration of the filament to consequently result in the drawback of significantly reducing the reliability of the magnetron 6.

As a method of stabilizing the filament temperature $T_f$ with respect to adjusting the output of the magnetron 6, disclosed is a method of providing the tertiary winding W3 with an ferroresonance function in the Japanese Patent Publication No. 56-3636 and Japanese Patent Laid-Open Publication No. 03-057193. Although the above-mentioned conventional examples propose a solution for stabilizing the filament temperature $T_f$ of the magnetron 6, they are not always capable of securely stabilizing the filament temperature $T_f$ in a variety of conditions, thus providing no solution to the above-mentioned problems occurring at the time of activating the high-frequency heating device.

SUMMARY OF THE INVENTION

Accordingly, it is a first object of the present invention to suppress the high voltage generated at the time of activating the high-frequency heating device as well as to achieve a rapid start of normal oscillation of the magnetron.

A second object of the present invention is to prevent the possible occurrence of the moding phenomenon which has been conventionally brought about at the time of starting the oscillation of the magnetron to thereby assure a high reliability.

A third object of the present invention is to provide a high-frequency heating device capable of maintaining the cathode temperature in a stable state without influence from such a condition as the operation frequency band of the power converter even when adjusting the microwave output of the magnetron.

The above-mentioned first and second objects can be achieved by adopting a construction comprising a power converter including a semiconductor switching element, a step-up transformer having a high-voltage secondary winding and a low-voltage secondary winding, a magnetron receiving both the outputs of the step-up transformer, a resonance circuit connected to the filament of the magnetron, and a control circuit for controlling the operation frequency of the power converter, wherein the control circuit controls the switching frequency of the semiconductor switching element so that the operation frequency of the power converter approximately coincides with the resonance frequency of the resonance circuit at the time of activating the power converter.

By activating the power converter at a frequency approximately equal to the resonance frequency of the resonance circuit, it becomes possible to assure a sufficient supply of filament current to the filament of the magnetron, while the operation frequency suppressing the high-voltage output of the step-up transformer does not permit generation of any extreme high voltage at the activation time to thereby achieve a high reliability.

In particular, by constructing the power converter so as to generate a voltage approximately equal to the voltage corresponding to the normal operation voltage below the moding voltage and by activating the power converter at the aforesaid resonance frequency, it becomes possible to securely prevent the possible occurrence of the moding phenomenon due to insufficient thermionic emission at the activation time, which also leads to achieving a high reliability.

The third object can be achieved by adopting a construction comprising a power converter including a semiconductor switching element, a step-up transformer having a high-voltage secondary winding and a low-voltage secondary winding, a magnetron receiving both the outputs of the step-up transformer, a resonance circuit directly connected to the filament of the magnetron, a control circuit for controlling the operation frequency of the power converter, electromagnetic shield means for shielding the power converter, the step-up transformer, the magnetron, the resonance circuit, and the control circuit substantially in an identical shield space, and a noise filter provided at the input section of the power converter.

The construction of eliminating the filter circuit having a frequency band of several tens of megahertz to several hundred megahertz provided at the filament terminal of the magnetron and of connecting a resonance circuit directly to the filament terminal achieves desirable resonance characteristics of the resonance circuit without receiving any influence from the filter circuit. The above construction is also capable of maintaining the desirable resonance characteristics of the resonance circuit all the time even when the operation frequency of the power converter is selected arbitrarily. Furthermore, the provision of shield means and a noise filter in the input section of the power converter can prevent the possible leakage of noise from the filament terminal of the magnetron, which enables stabilization of the filament temperature of the magnetron, rapid activation with a low voltage applied across the anode and the cathode, and secure prevention of the moding phenomenon without receiving any influence from such a condition as the operation frequency band of the power converter.

BRIEF DESCRIPTION OF THE DRAWINGS

FIGS. 2 (a), (b), and (c) are operation waveforms of an inverter circuit in the same embodiment;

FIGS. 5 (a) and (b) are equivalent circuit diagrams of a filament circuit in the same embodiment;

FIGS. 10 (a), (b), and (c) are charts of the characteristics respectively of the voltage VAK across the anode and the cathode, the filament current $I_f$, and the filament temperature $T_f$ changing with respect to time from the activation time of the same embodiment;

FIGS. 13 (a), (b), and (c) are charts of the characteristics respectively of VAK, $I_f$, and $T_f$ changing with respect to time from the time of activating the same device.

PREFERRED EMBODIMENT OF THE INVENTION

Figure 1:
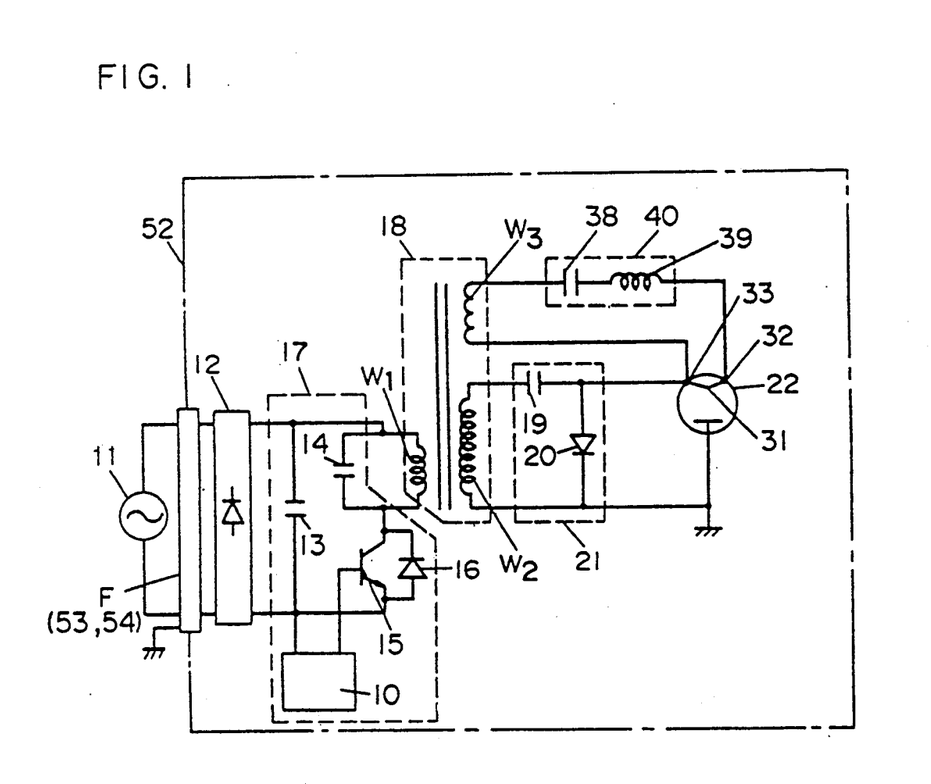
FIG. 1 is a circuit diagram of a high-frequency heating device in accordance with an embodiment of the present invention.
Figure 2A:
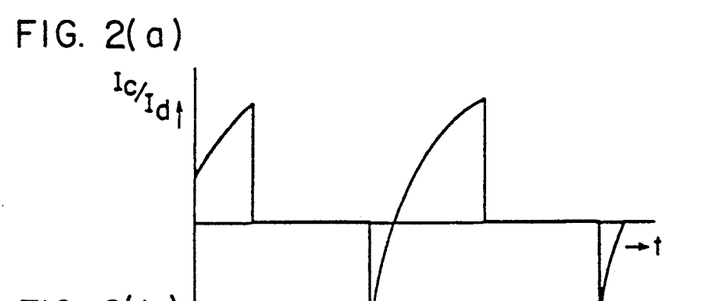
Figure 2B:
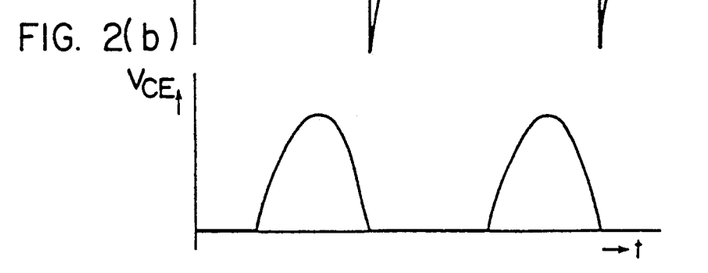
Figure 2C:
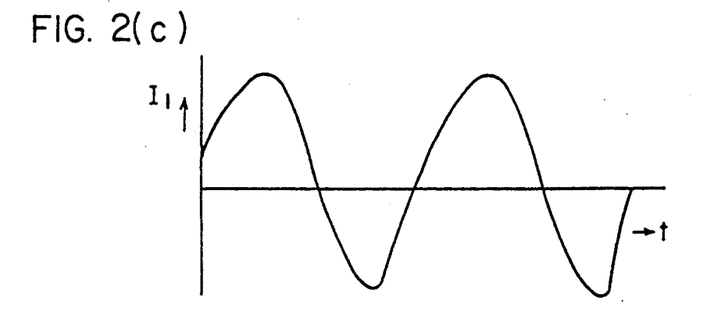

FIG. 1 shows a circuit diagram of a high-frequency heating device in accordance with an embodiment of the present invention, in which a commercial AC power source 11 is rectified by a rectifier 12 to be formed into a DC power and then converted into a high-frequency AC power by an inverter circuit 17 (switching circuit) comprising capacitors 13 and 14, a semiconductor switching element 15, and a diode 16. The inverter circuit 17 employs a so-called voltage resonance type inverter circuit arrangement of one transistor. The high-frequency AC power obtained by the inverter circuit 17 is applied to a transformer 18. The transformer 18 comprises a primary winding W1 to which the high-frequency AC power produced by the inverter circuit 17 is applied, a secondary winding W2 which yields a high voltage through a voltage step-up, and a tertiary winding W3 which yields a low voltage, and the like. The operation of the inverter circuit 17 is well known and, therefore, a description thereof is omitted herein. The switching element 15 is controlled to be turned on and off by a control signal from a control circuit 10, which is operated with the operation waveforms as shown in FIGS. 2 (a), (b), and (c). That is, FIGS. 2 (a), (b), and (c) represent respectively the currents Ic and Id respectively flowing through the switching element 15 and the diode 16, the voltage $V_{CE}$ of the switching element 15, and the current $I_1$ flowing through the primary winding W1 of the transformer 18, in which it is possible to produce a high-frequency AC power corresponding to the switching frequency of the switching element 15.

The high AC voltage yielded in the secondary winding W2 is converted into a high DC voltage by a voltage doubler rectifier 21 comprising a capacitor 19 and a diode 20, and the obtained high DC voltage is applied across the anode and the cathode of a magnetron 22 to activate the magnetron. It is noted that the reference letter F denotes a noise filter while the reference numeral 52 denotes a shield casing which are described in detail hereinafter.

Figure 3:
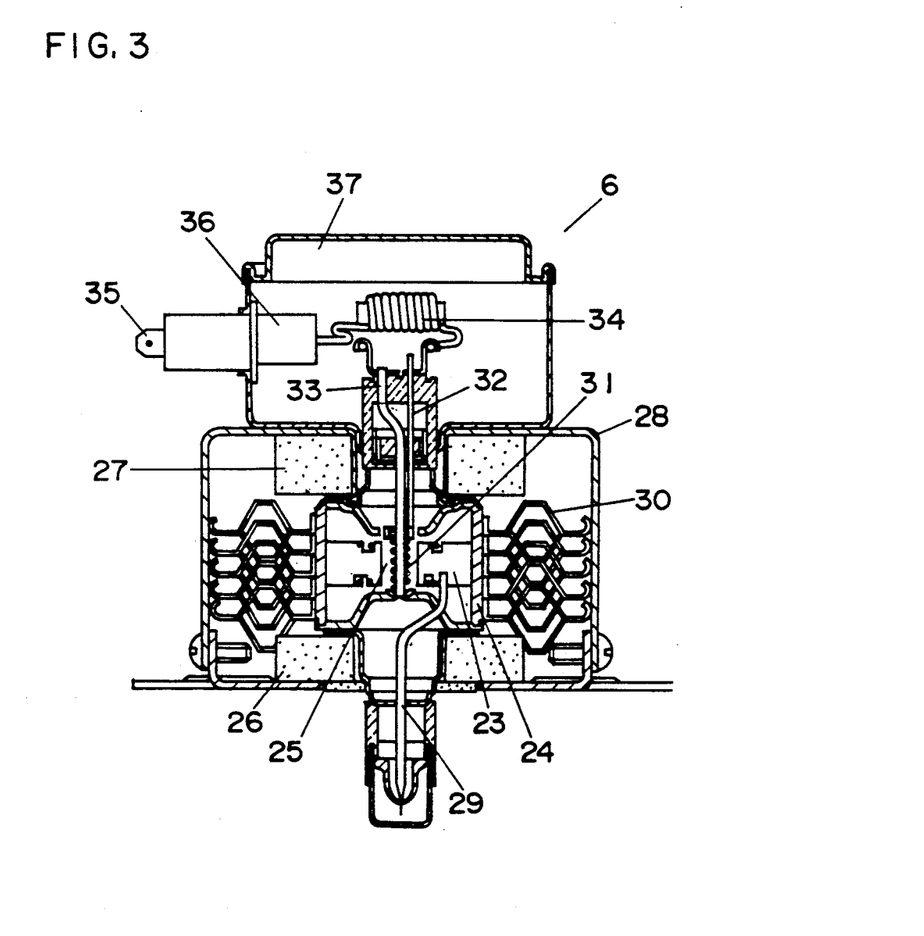
FIG. 3 is a schematic section view of an ordinary magnetron.

The following describes the magnetron 22. An ordinary magnetron 6 has a construction as shown in FIG. 3, in which the magnetron 22 comprises an anode block 24 having an anode vane 23, permanent magnet units 26 and 27 for providing a magnetic field to an operation space 25, a yoke 28 for forming a magnetic circuit, an antenna 29 connected to the anode vane 23, a heat radiation fin 30, a cathode (filament) 31 put in the operation space 25, a main section including filament leads 32 and 33, a first choke coil 34 connected to the filament lead 32, a second choke coil 34' (not shown) connected to the filament lead 33, and a choke box 37 enclosing a built-in through capacitor 36 having a connection terminal 35 to which the first and second choke coils 34 and 34' are connected. The two choke coils 34 and 34' and the through capacitor 36 are provided for preventing noise having frequencies of several tens of megahertz to several hundred megahertz from leaking through the cathode leads 32 and 33 to the outside of the magnetron 6 and are designed to have particular inductance and capacitance appropriate for achieving a satisfactory attenuation characteristic in the above-mentioned frequency range. Any ordinary magnetron is used with a choke box included therein.

In the embodiment of FIG. 1, the magnetron 22 is not provided with such a choke box, i.e., the magnetron 22 is not provided with the choke coils 34 and 34' for filter and the through capacitor 36 as shown in FIG. 3.

The tertiary winding W3 is connected directly to the cathode leads 32 and 33 of the magnetron 22 via a resonance circuit 40 consisting of a resonance capacitor 38 and a resonance inductor 39.

Figure 4:
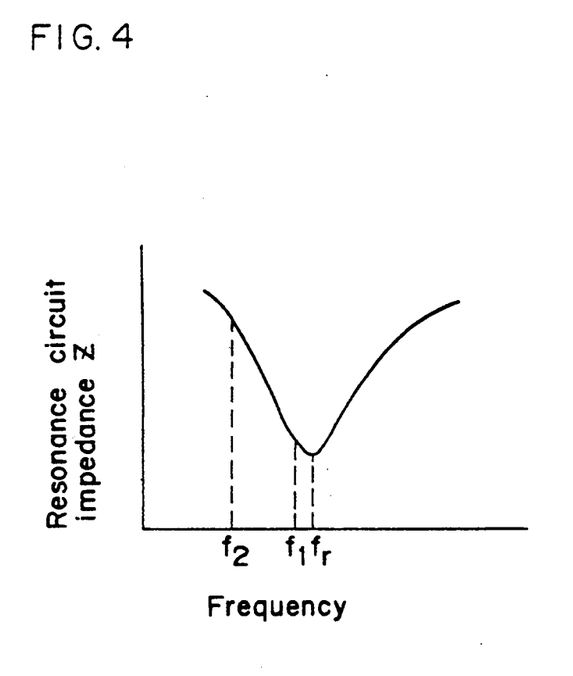
FIG. 4 is a chart of resonance characteristics of a resonance circuit in the same embodiment.
Figure 5A:
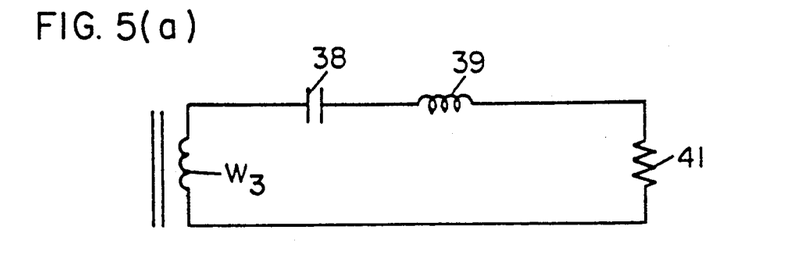
Figure 5B:
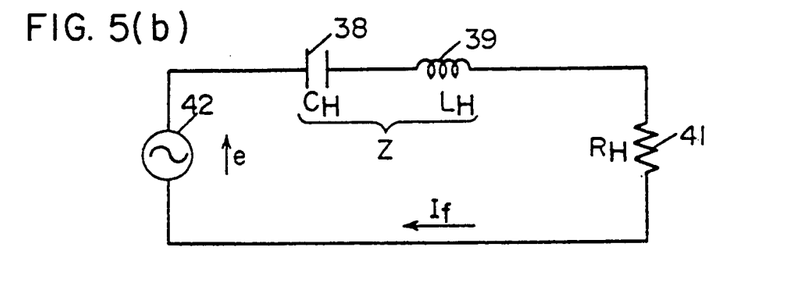

The resonance circuit 40 exhibits a resonance characteristics as shown in FIG. 4 where the impedance Z takes the minimum value thereof, theoretically reduced to zero ohm, at the resonance frequency fr. In more detail, the load circuit of the tertiary winding W3 for supplying a current to the filament 31 of the magnetron 22 serves as a so-called L-C-R series resonance circuit consisting of the equivalent resistance 41 for the filament 31, and the resonance capacitor 38 and the resonance indictor 39 for the resonance circuit 40 as shown in FIG. 5 (a), which can be assumed as shown in FIG. 5 (b). Assuming that the voltage yielded in the tertiary winding W3 is a voltage source 42, the L-C-R series resonance circuit is considered to be connected to the voltage source 42.

Therefore, assuming that the voltage of the voltage source 42 is e, the impedance of the resonance circuit 40 is Z, and the equivalent resistance of the filament is $R_H$, the current $I_f$ flowing through the filament can be expressed as follows:

$$I_f = e/(R_H + Z)$$

Therefore, the filament current $I_f$ takes the maximum value thereof at the resonance frequency fr when the voltage e is constant, which means that the filament current $I_f$ is reduced at any frequency which is higher or lower than the resonance frequency fr.

Figure 6:
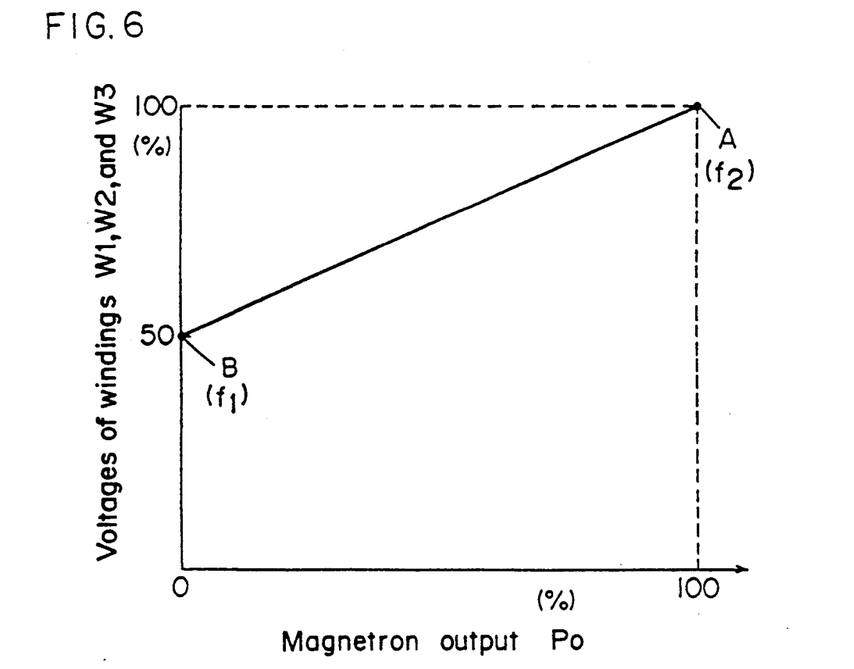
FIG. 6 is a chart of characteristics of a voltage in each winding of a step-up transformer with respect to a magnetron output Po in the same embodiment.

On the other hand, when the operation frequency of the voltage resonance type inverter circuit 17 is varied from $f_2$ to $f_1$ ($f_1 > f_2$) and the magnetron output Po is varied from 100% to 0%, the output e of the windings W1, W2, and W3 of the step-up transformer varies as indicated from the point A to the point B in FIG. 6, that is, the voltage e varies from 100% to about 50%. This is because the magnetron 22 exhibits non-linear volt-ampere characteristics as shown in FIG. 12.

At the time of activating the inverter circuit having the characteristics as described above, without provision of the resonance circuit 40, the filament current $I_f$ inevitably reduces when the output voltage of the high-voltage secondary winding W2 is suppressed to reduce the voltage VAK across the anode and the cathode, meaning that it has been conventionally difficult to increase the filament temperature $T_f$ to a desirable temperature. However, by using the resonance circuit 40 with fr≈$f_1$ and activating the inverter circuit 17 at an operation frequency around the above-mentioned frequency, the filament current $I_f$ can be kept constant even when the voltage e yielded in the tertiary winding W3 reduces to about half, and the filament temperature can be made to a desirable value (about 2,000° K.) while maintaining the voltage VAK across the anode and the cathode at a normal degree of an operation voltage (−6 KV to −4 KV) below the moding voltage VAKm (about −6 KV).

Figure 7:
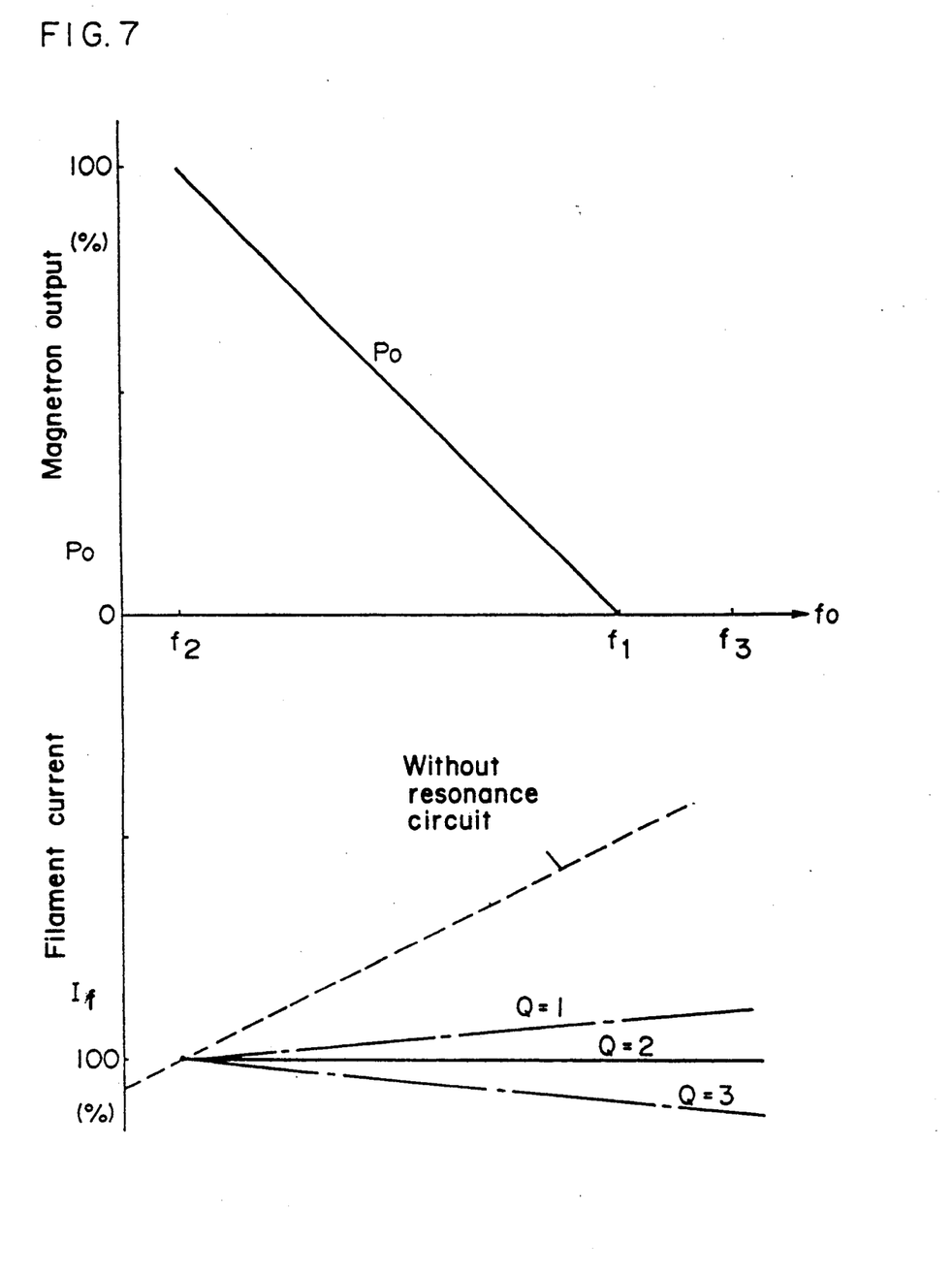
FIG. 7 is a chart of characteristics of the magnetron output Po and the filament current $I_f$ with respect to an operation frequency fo in the same embodiment.

FIG. 7 shows the variations of the magnetron output Po and the filament current $I_f$ when the operation frequency fo of the inverter is varied from $f_1$ to $f_2$. In FIG. 7, assuming that the resonance capacitance is $C_H$, the resonance inductance is $L_H$, and the equivalent resistance for the filament is $R_H$, the filament current $I_f$ may be expressed using the impedance ratio $$Q = \sqrt{L_H/C_H}/R_H$$

adopted as a parameter.

As is apparent from FIG. 7, the variance of the filament current $I_f$ taking place when the frequency fo is varied from $f_2$ to $f_1$ can be not greater than ±10% under the condition of $Q \approx 2 \pm 1$. This is because the relationship between the magnetron output Po and the output voltage e of the step-up transformer 18 has frequency characteristics as shown in FIG. 6 when the magnetron 22 is driven by the voltage resonance type inverter 17.

Therefore, by selecting a resonance circuit satisfying $Q \approx 2$, a voltage VAK across the anode and the cathode around the normal operation voltage below (or much lower than) the moding voltage VAKm, and activating the inverter circuit 17 at the operation frequency fo around the resonance frequency $f_r$ of the resonance circuit, it is possible to provide a high-frequency heating device which can rapidly activate the oscillation operation of the magnetron at a low voltage across the anode and the cathode without bringing about the moding phenomenon.

For example, when an inverter circuit where $f_2 = 20$ kHz is used, the frequency $f_1 \approx 28$ kHz. According to an experiment, the desirable values of $L_H$ and $C_H$ in the above condition are $C_H = 6$ μF and $L_H = 3$ μH. Since the equivalent resistance $R_H$ of the magnetron filament is 0.3Ω, the following equation can be derived.

$$Q = \sqrt{L_H/C_H}/R_H$$
$$= \sqrt{3\mu H/6\mu H}/0.3\Omega \approx 2.4$$

Therefore, the filament current $I_f$(10.5 A) at the frequency $f_1$ is slightly greater than the $I_f$(10.0 A) at the frequency $f_2$. In the above condition, the inductance $L_H$ is nearly equal to the total inductance of the choke coils 34 and 34' for preventing noise from leaking out of the magnetron 6, therefore the inductance $L_H$ can concurrently serve as a means for filtering noise.

However, when an inverter circuit where $f_2 = 150$ kHz is used, the frequency $f_1 \approx 200$ kHz, and the desirable experimental values of $L_H$ and $C_H$ are $L_H = 0.4$ μH and $C_H = 0.8$ μF. Therefore, the following equation holds.

$$Q = \sqrt{L_H/C_H}/R_H$$
$$= \sqrt{0.4\mu H/0.8\mu F}/0.3\Omega \approx 2.4$$

In the above condition, the inductance $L_H$ amounts to about 3 μH when the choke coils 34 and 34' exist, therefore the inductance of 0.4 μH is hardly achieved.

In view of the above, the present invention adopts a construction where the resonance circuit 40 is directly connected to the filament lead 32 of the magnetron 22 without using the choke coils 34 and 34'.

Figure 8:
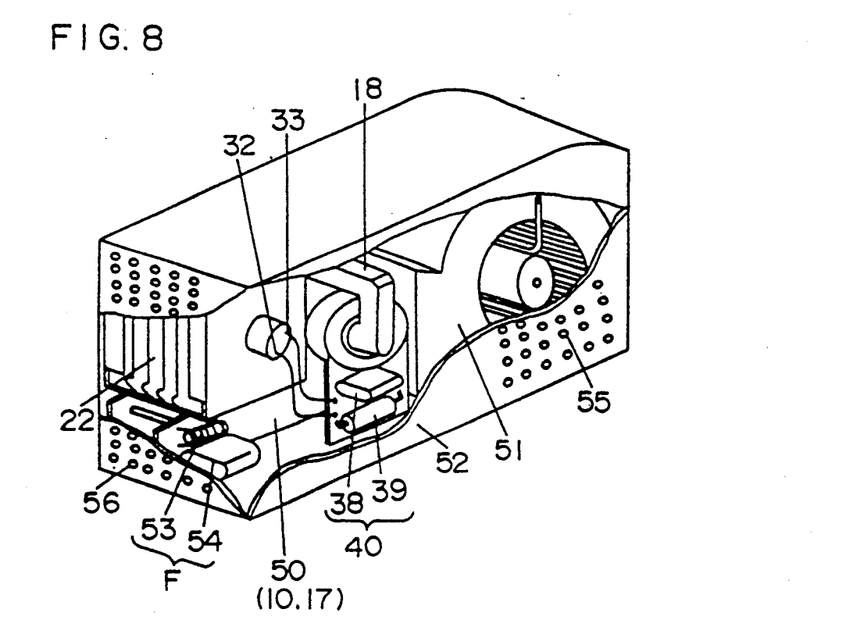
FIG. 8 is a perspective view of a power section with a portion removed in the same embodiment.

Furthermore, as shown in FIG. 8, the magnetron 22, a circuit board 50 including resonance circuit 40, step-up transformer 18, inverter circuit 17, and control circuit 10, and a cooling fan 51 are mounted in a metal casing 52. In addition, a filter F comprising a choke coil 53, a capacitor 54 and the like is provided in the input section of the inverter circuit 17 to filter noise having frequencies of several tens of megahertz to several hundred megahertz to thereby prevent noise from leaking toward the commercial power source 11 and elsewhere. It is noted that the numerals 55 and 56 denote holes each of which having such a diameter as to prohibit the leakage of microwave while serving as an inlet and outlet of air.

Although the inductance $L_H$ of the resonance inductor 39 of the resonance circuit 40 is obtained only with the independent inductor 39 in the embodiment of FIG. 1, it is also possible to make the leakage inductance of the tertiary winding W3 share the whole or a part of the inductance $L_H$. Particularly when the operation frequency of the inverter circuit 17 is high, the inductance $L_H$ takes a small value not greater than 1 μH, therefore, the inductance $L_H$ can be obtained only with the leakage inductance of the winding W3 and the inductance (0.2 to 0.3 μH) of the filament 31.

Figure 9:
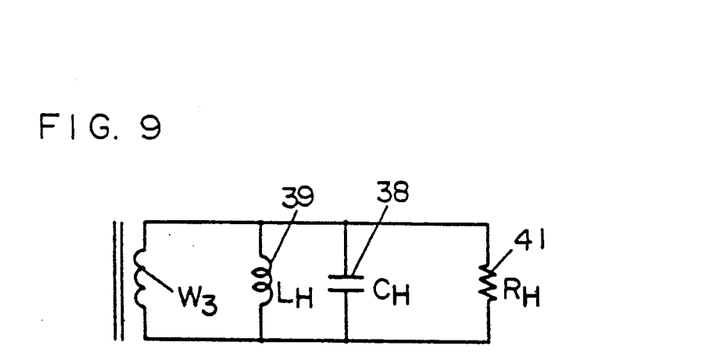
FIG. 9 is a circuit diagram of another aspect of the resonance circuit for the same embodiment.

The resonance circuit 40 can produce the same effect by connecting a parallel resonance circuit in parallel with the filament resistance $R_H$ as shown in FIG. 9. In more detail, since the impedance of the parallel resonance circuit takes the maximum value thereof at the resonance frequency fr, the same effect as produced by the series resonance circuit in FIG. 1 can be obtained by providing a resonance circuit in parallel with $R_H$. However, since the filament resistance $R_H$ normally takes a small value of about 0.3Ω, the series resonance circuit is more advantageous in terms of reducing the current flowing through the winding W3.

Figure 10A:
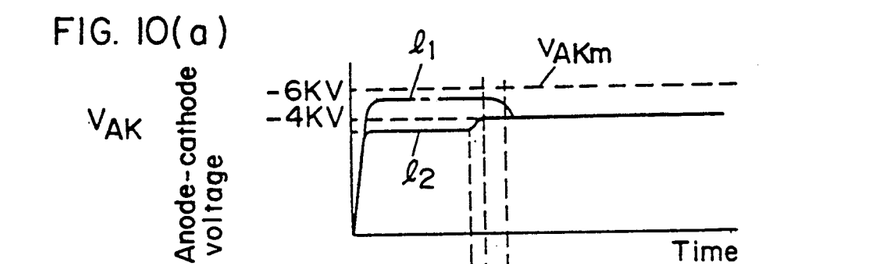
Figure 10B:
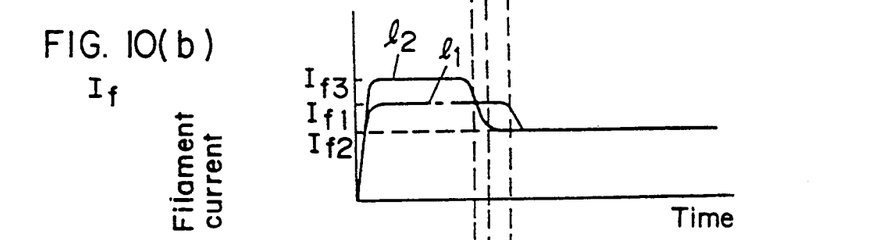
Figure 10C:
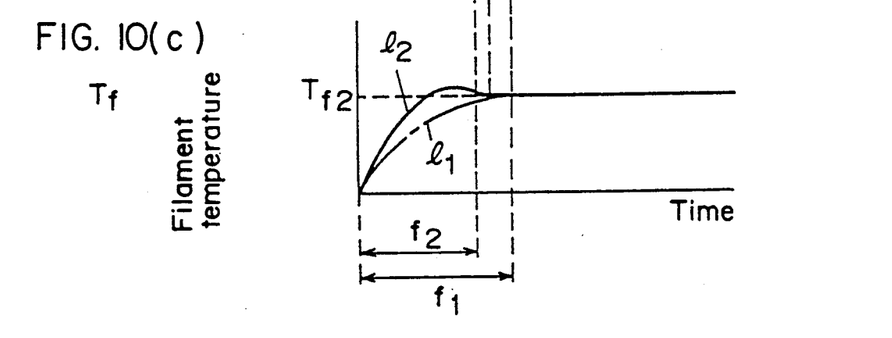

FIGS. 10 (a), (b), and (c) show how the voltage VAK across the anode and the cathode, the filament current $I_f$, and the filament temperature $T_f$ vary at the time of activating the inverter circuit 17 when the above-mentioned resonance circuit 40 is used. Referring to FIG. 10, the alternate long and short dash line 11 represents a case where fo in FIG. 7 activates when fo=$f_1$ and becomes fo=$f_2$ after lapse of time $t_1$. In the meantime, VAK is suppressed below the moding voltage VAKm=−6 kV, while the current $I_f=I_{f1}$ slightly greater than $I_f=I_{f2}$ in the stable oscillation condition. On the other hand, the solid line 12 represents a case where activation starts with fo at the activation time set higher than $f_1$, i.e., in a condition where fo=$f_3$ and $f_r \approx f_s$ in FIG. 7, when VAK is suppressed below the oscillation operation voltage VAK=−4 kV and then a stable oscillation condition is achieved with fo=$f_2$ after lapse of time $t_2$.

In the above case, $I_f$ is $I_{f3}$ greater than $I_{f1}$ and VAK can be suppressed. However, an excessive increase of fo results in a significantly excessive filament temperature $T_f$ over the temperature $T_{f2}$, which conversely degrades the reliability. Therefore, it is desirable that VAK at the activation time has a value of −6 kV to −4 kV approximately equal to the oscillation operation voltage lower than VAKm.

INDUSTRIAL APPLICABILITY

As described in detail above, the present invention has a construction comprising a power converter, a step-up transformer, a magnetron, a resonance circuit connected to the magnetron filament, and a control circuit, where the controller controls the power converter so that the operation frequency of the power converter approximately coincides with the resonance frequency of the resonance circuit at the time of activating the power converter. With the above construction, the filament current of the magnetron can be controlled to a desirable value at the activation time to achieve a rapid start of the oscillation operation, and an activation with a low voltage applied across the anode and the cathode can be achieved without bringing about the moding phenomenon. The above also leads to a short rise time of heating the filament as well as generating no high voltage to therefore necessitate no increase of the endurance voltages of the parts employed, which also permits reduction of the cost and size of the parts. Furthermore, the occurrence of no moding phenomenon assures the provision of a high-frequency heating device having a high reliability with a reduction of the activation voltage.

Furthermore, with the construction of directly connecting the resonance circuit to the filament lead of the magnetron and mounting the constituent parts such as the power converter in a shield casing while providing a filter at the input section of the power converter, the resonance characteristic of the resonance circuit can be made to exhibit a desirable frequency characteristics even when the operation frequency of the power converter is selected arbitrarily. In other words, whatever operation frequency band the power converter has, the filament temperature can be maintained at a stable and desirable value without regard to the magnitude of the microwave output of the magnetron, which also assures the provision of a high-frequency heating device having a high reliability. Furthermore, in the above-mentioned construction, by making the operation frequency of the power converter coincide with the resonance frequency of the resonance circuit at the activation time, a rapid start of the oscillation operation can be achieved with the aforesaid low voltage applied across the anode and the cathode while securely preventing the possible occurrence of the moding phenomenon.

What is claimed is:

1. A high-frequency heating device for heating an object, said high-frequency heating device comprising:
   (a) a power converter, having a semiconductor switching element, for converting a received electric power into a high-frequency electric power,
   (b) a step-up transformer having a primary winding for receiving an output from said power converter, a secondary winding for yielding a high-voltage electric power output, and a tertiary winding for yielding a low-voltage electric power output,
   (c) a magnetron having an anode and a filament which receive respectively said high-voltage electric power and said low-voltage electric power of said step-up transformer,
   (d) a resonance circuit including at least an inductance and a capacitance connected to said filament, said resonance circuit suppressing a variation of a current of said filament, wherein at least a part of said resonant circuit is connected to a leakage inductance of said tertiary winding and
   (e) a control circuit for controlling an operation frequency of said power converter by controlling a switching frequency of said semiconductor switching element, and for controlling said switching frequency so that said operation frequency of said power converter approximately coincides with a resonance frequency of said resonance circuit upon activating said power converter.

2. A high-frequency heating device for heating an object, said high-frequency heating device comprising:
   (a) a power converter, having a semiconductor switching element, for converting a received electric power into a high-frequency electric power,
   (b) a step-up transformer having a primary winding for receiving an output from said power converter, a secondary winding for yielding a high-voltage electric power output, and a tertiary winding for yielding a low-voltage electric power output,
   (c) a magnetron having an anode and a filament which receive respectively said high-voltage electric power and said low-voltage electric power,
   (d) a resonance circuit including at least an inductance and a capacitance connected to said filament, said resonance circuit suppressing a variation of a current of said filament, wherein at least a part of said resonant circuit is connected to a leakage inductance of said tertiary winding
   (e) a control circuit for controlling an operation frequency of said power converter by controlling a switching frequency of said semiconductor switching element,
   (f) electromagnetic shield means for shielding said power converter, said step-up transformer, said resonance circuit, said magnetron, and said control circuit substantially in an identical shielding space, and
   (g) a noise filter provided at an input of said power converter.

3. A high-frequency heating device as claimed in claim 1 or 2, wherein said control circuit controls said switching frequency so that said operation frequency is adjusted to approximately coincide with said resonance frequency to thereby supply a voltage which is approximately equal to or lower than an oscillation operation voltage of said magnetron to said magnetron upon activating said power converter.

4. A high-frequency heating device as claimed in claim 3, wherein said control circuit controls said switching frequency so that said operation frequency is adjusted to supply a voltage which is higher than the oscillation voltage of said magnetron and lower than a moding voltage to said magnetron at the time of activating said power converter.

5. A high-frequency heating device as claimed in claim 1 or 2, wherein said resonance circuit is connected in series with said filament, and wherein, defining an equivalent resistance of the filament of said magnetron as $R_H$, and an inductance and capacitance of said resonance circuit respectively as $L_H$ and $C_H$, an impedance ratio Q at said resonance frequency satisfies the equation:

$$Q = \sqrt{L_H/C_H}/R_H \approx 2 \pm 1$$

6. A high-frequency heating device as claimed in claim 1, wherein at least one of a capacitor and an inductor composing said resonance circuit is directly connected to the filament lead terminal of said magnetron, and wherein said filament lead terminal, said step-up transformer, and said power converter are mounted in an electrical shield casing.

* * * * *

UNITED STATES PATENT AND TRADEMARK OFFICE
CERTIFICATE OF CORRECTION

PATENT NO. : 5,300,744
DATED : April 5, 1994
INVENTOR(S) : Naoyoshi MAEHARA et al.

It is certified that error appears in the above-indentified patent and that said Letters Patent is hereby corrected as shown below:

Cover page, item [22], change "1992" to --1991--; and

Cover page, item [86], change "1982" to --1992--.

Signed and Sealed this

Sixth Day of September, 1994

Attest:

BRUCE LEHMAN

*Attesting Officer*        *Commissioner of Patents and Trademarks*